United States Patent
Breda et al.

(10) Patent No.: US 7,566,127 B2
(45) Date of Patent: Jul. 28, 2009

(54) EYEGLASS FRAME WITH TEMPLES HAVING TWO ORTHOGONAL AXES OF ROTATION AND FORMING A CASE WHEN FOLDED

(75) Inventors: Pierluigi Breda, Pieve di Soligo (IT); Alessandro Mazzero, Nervesa della Battaglia (IT)

(73) Assignee: Foto Ottica Cescon di Cescon Stefano, Spresiano (Treviso) (IT)

( * ) Notice: Subject to any disclaimer, the term of this patent is extended or adjusted under 35 U.S.C. 154(b) by 139 days.

(21) Appl. No.: 10/589,699

(22) PCT Filed: Feb. 16, 2005

(86) PCT No.: PCT/IT2005/000077

§ 371 (c)(1),
(2), (4) Date: May 10, 2007

(87) PCT Pub. No.: WO2005/081045

PCT Pub. Date: Sep. 1, 2005

(65) Prior Publication Data

US 2007/0279580 A1      Dec. 6, 2007

(30) Foreign Application Priority Data

Feb. 20, 2004   (IT) .......................... TV2004A0018

(51) Int. Cl.
*G02C 5/08*   (2006.01)
(52) U.S. Cl. ............................ 351/63; 351/41; 206/5
(58) Field of Classification Search ................... 351/63, 351/41, 111, 112, 115, 116, 118, 119, 158; 206/5
See application file for complete search history.

(56) References Cited

U.S. PATENT DOCUMENTS

| | | | | |
|---|---|---|---|---|
| 3,049,974 | A * | 8/1962 | Miwa | 351/83 |
| 3,361,515 | A * | 1/1968 | Vanderbeek | 351/121 |
| 5,638,146 | A | 6/1997 | Nannini | |
| 6,102,541 | A | 8/2000 | Kuo et al. | |
| 6,530,660 | B1 | 3/2003 | Chao et al. | |
| 7,198,366 | B2 * | 4/2007 | Gao | 351/63 |

FOREIGN PATENT DOCUMENTS

EP   1 008 888 A   6/2000
GB   1 372 417 A   10/1974

* cited by examiner

*Primary Examiner*—Hung X Dang
(74) *Attorney, Agent, or Firm*—Katten Muchin Rosenman LLP

(57) ABSTRACT

An eyeglass frame includes a first and second semi-shell shaped earpieces, rotationally linked to a first and second hinge. The hinges are linked to a frontal piece having at least one lens. The earpieces close to form a shell to temporarily hold the frontal piece and the lens.

23 Claims, 5 Drawing Sheets

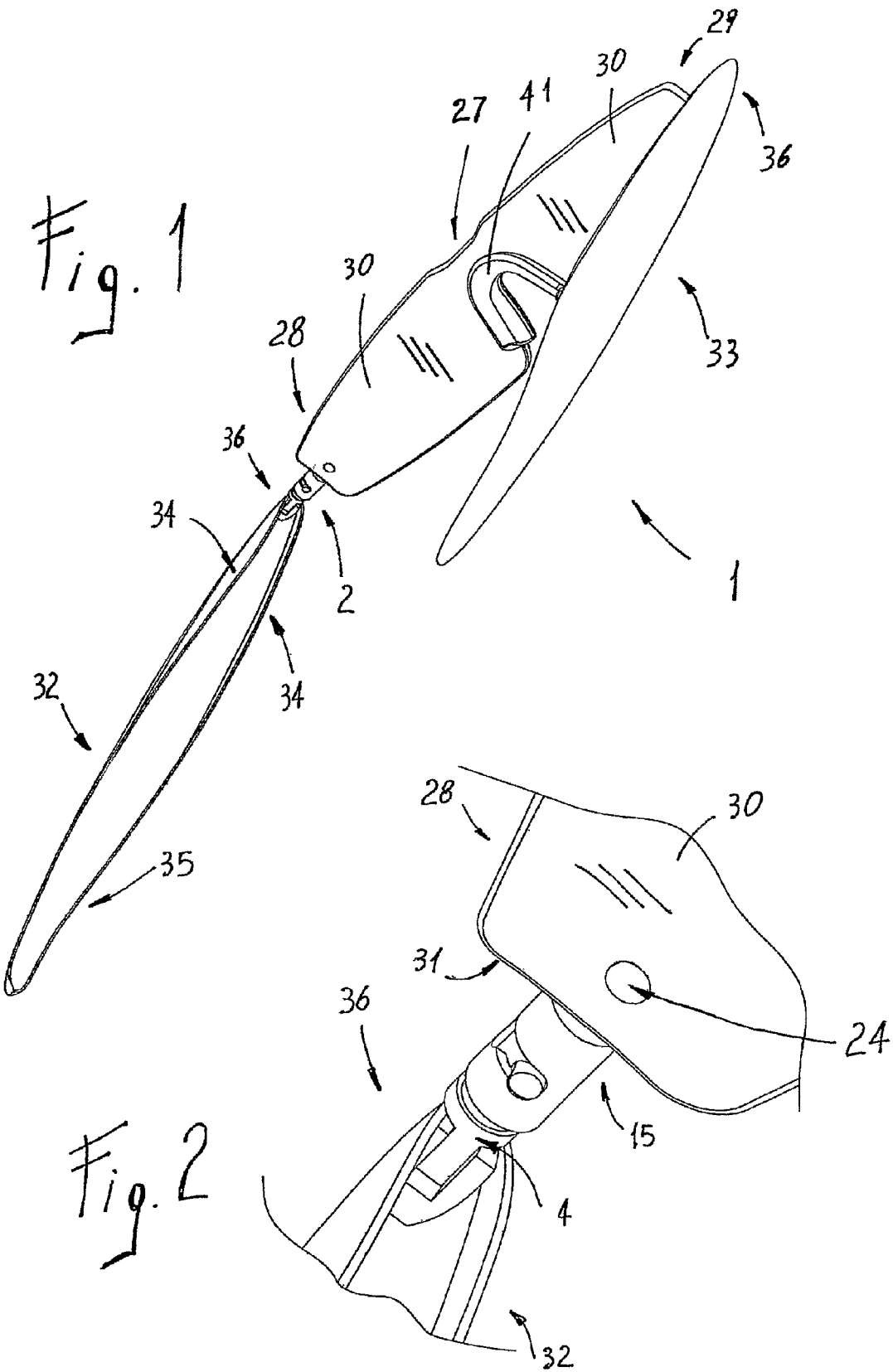

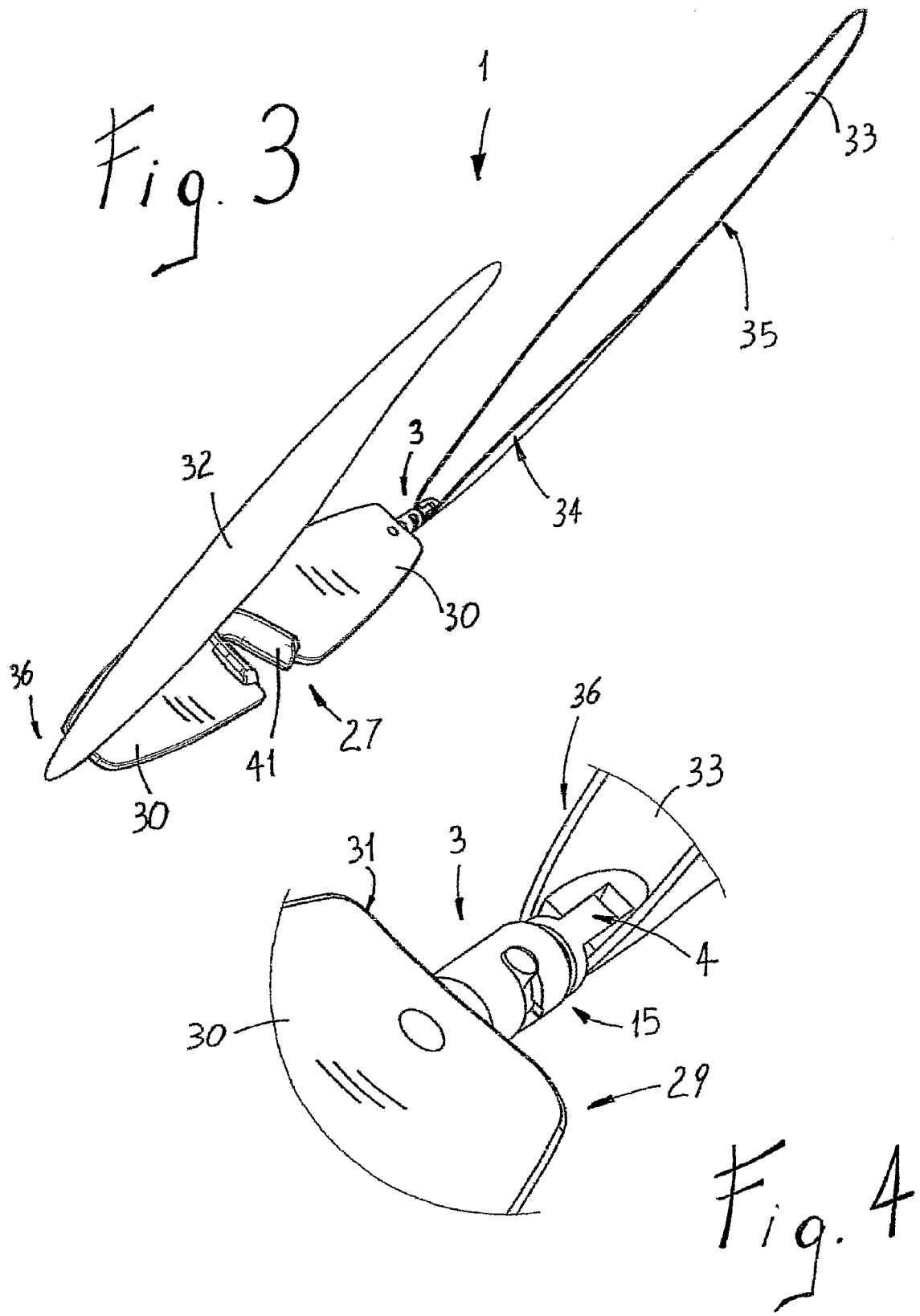

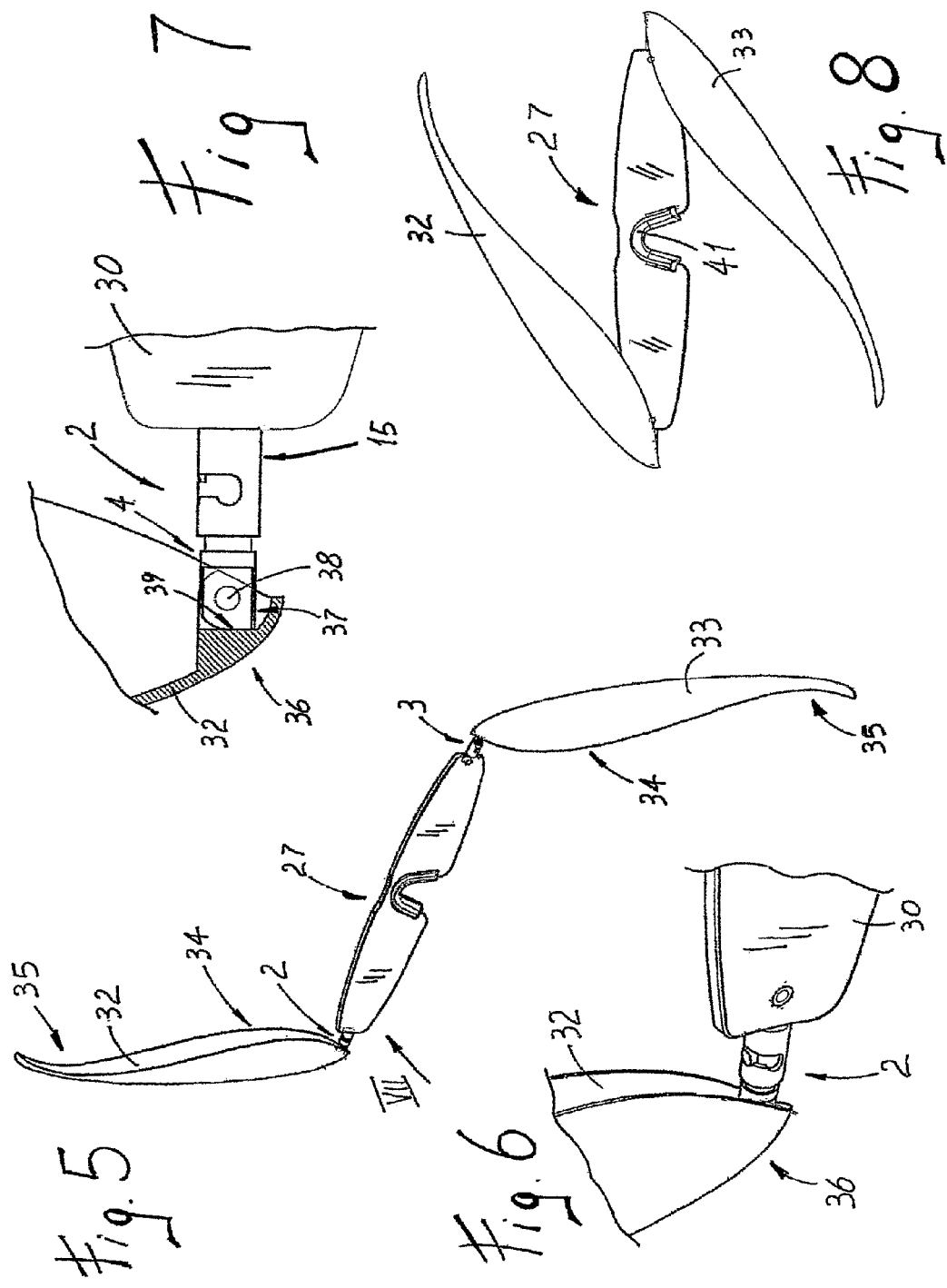

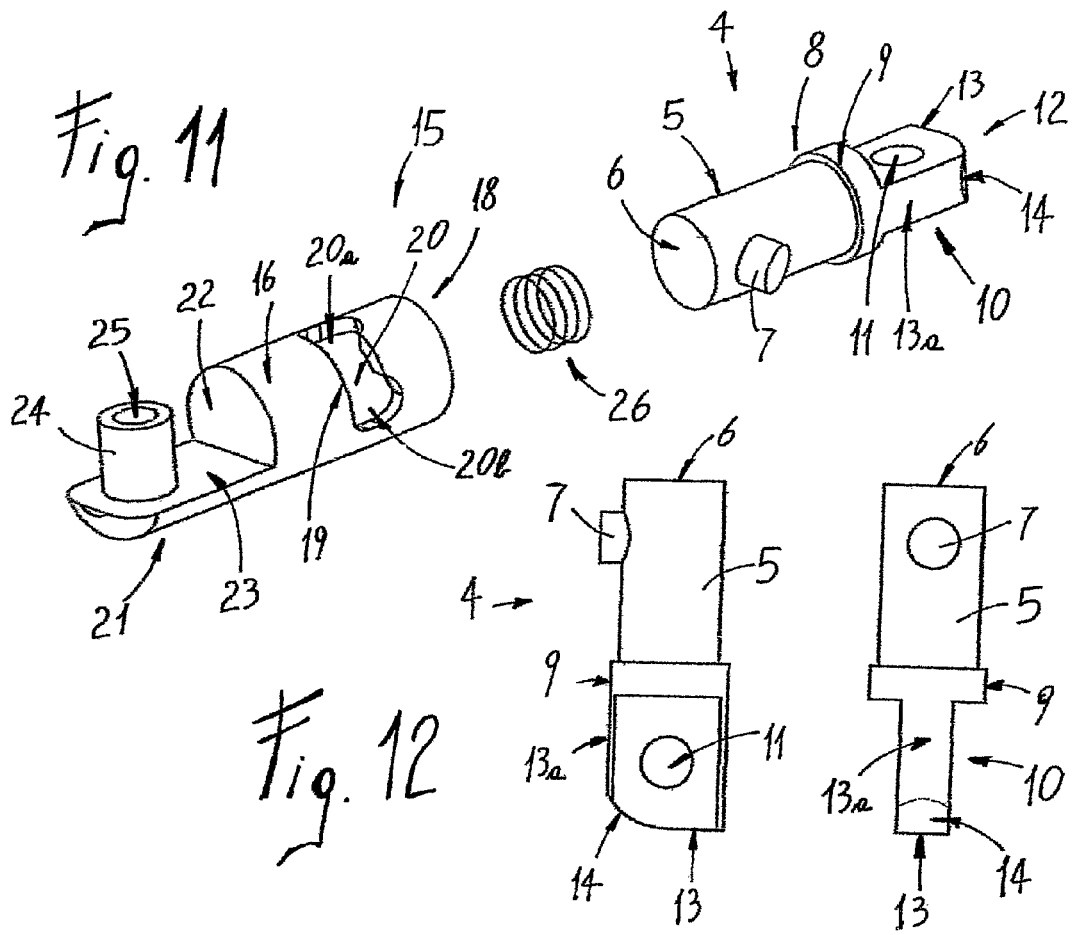
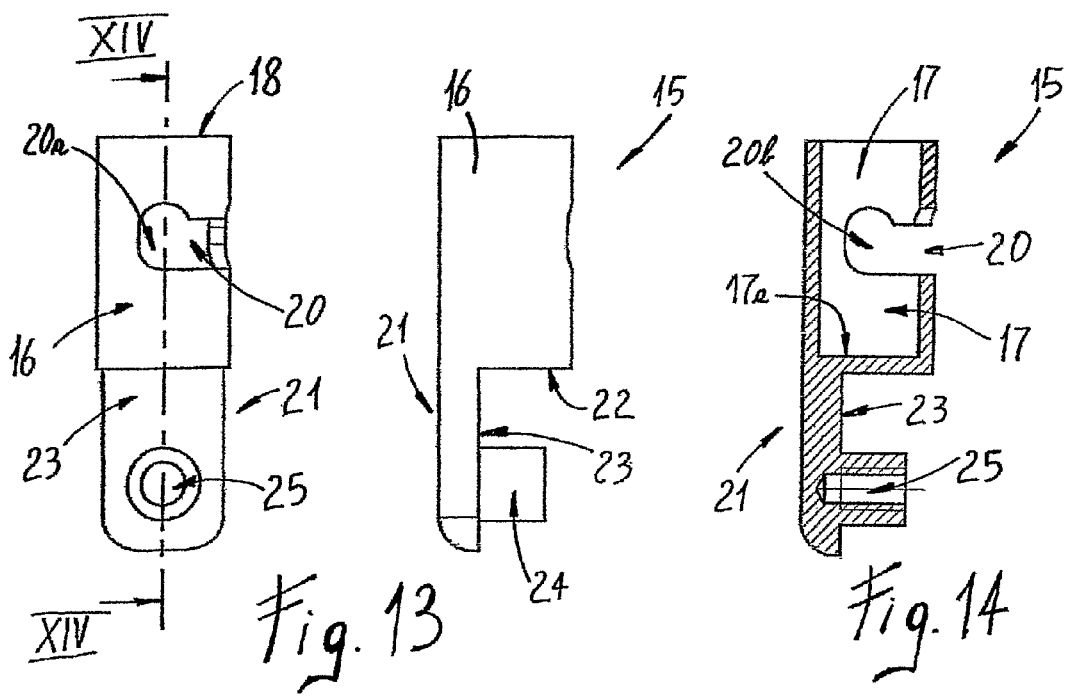

US 7,566,127 B2

EYEGLASS FRAME WITH TEMPLES HAVING TWO ORTHOGONAL AXES OF ROTATION AND FORMING A CASE WHEN FOLDED

This application is the National Stage of International Application No. PCT/IT2005/000077, filed Feb. 16, 2005, which claims the benefit under 35 U.S.C. 119 (a-e) of Italian Application No. TV2004A000018 filed Feb. 20, 2004, which is herein incorporated by reference.

TECHNICAL FIELD

The invention relates in particular to an eyeglass frame which is distinguished by the fact that it contains a first and second hinge, made up of a first body, rotationally linked to a semi-shell shaped earpiece and rotationally interactive, in contrast with an elastically adaptable element, with a second hollow body linked to a frontal piece and/or at least one lens. The first and second earpieces can close to form a shell to temporarily hold the frontal piece and/or at least one lens.

BACKGROUND ART

One example of this type of glasses frame exists in the prior art: EP0723673, which reduces size by rotating the earpieces that are divided in two segments, one short and one long, but still must be stored in a suitable case after use.

DISCLOSURE OF INVENTION

The subject of this invention is an eyeglass frame. The technological evolution experienced by the eyeglass industry has permitted the market introduction of products able to offer users increasingly better performance especially in recent years.

Research in this sector has been specifically focused on the introduction of highly resistant and lightweight materials able to create extremely compact and lightweight frames in mass produced eyeglasses.

At the same time, the application of new materials and advanced production technologies have led to the development of lenses which, while guaranteeing high corrective strength or improved sun radiation protection, reduce weight and thickness.

Thus, more lightweight eyeglasses have been developed whose structural and functional elements, for the most part, contain less resistant sections and are preferably more flexible to better withstand the strain derived from their use, especially when the frames are manipulated to put on or take off the eyeglasses.

The main disadvantage of this known type of glasses is the fact that, also due to the abovementioned design objectives, they are particularly fragile when subjected to strains other than those foreseen during use such as, for example, accidental impacts or damages they can incur when not worn by the user or when being stored in their specific and distinct cases.

Furthermore, the lenses placed in the frame, even in the case of sunglasses, can easily be scratched or scuffed by foreign objects, even more easily when the eyeglasses are stored without adequate protection when removed.

A partial solution to this problem is the use of special eyeglass cases to be used when not worn by the user for both prescription lenses and sunglasses.

Known eyeglass cases may be hard or soft and are internally lined with very soft material to protect the eyeglasses from strains, that could compromise their integrity, and from foreign objects that could scratch the lenses.

The main problem of these known cases is the fact that, when separated from the eyeglasses they are designed to hold, they force the user to continually carry them around so that they are available when needed.

Since these known cases must be large enough to hold a pair of eyeglasses, although folded, within, they are cumbersome especially when made of a hard structure.

These known cases can be especially bulky when the user is wearing sunglasses, for example, during a sporting event or sunbathing, situations in which carrying these known cases is extremely awkward.

The main purpose of the subject of this invention is, therefore, to resolve the indicated technical problems, eliminating the difficulties in the mentioned known technique and therefore to discover an eyeglass frame that can be quickly stored without requiring external elements to protect it.

Within the abovementioned accomplishment, another important purpose is to create an eyeglass whose operation is simple and sure.

Another important purpose is to realize an eyeglass with an aesthetically pleasing look in all operating conditions.

Also, and not least important, is to create an eyeglass that is structurally simple with limited production costs.

In the construction examples that follow, single features, listed according to specific examples, can actually be exchanged with other different features that exist in other construction examples.

Additional aspects and advantages of the find are further emphasized by the detailed description of the special, but not exclusive, creation shape, illustrated in brief but not limited to the enclosed drawing.

BRIEF DESCRIPTION OF DRAWINGS

FIG. 1 illustrates, in perspective, the frame according to the find in the use position;

FIG. 2 illustrates, in perspective, a detail of the frame in the use position;

FIG. 3 illustrates, in perspective, the frame in the use position;

FIG. 4 illustrates, in perspective, a detail of the frame in the use position;

FIG. 5 illustrates, in perspective, the frame in the first partial fold position;

FIG. 6 illustrates, in perspective, a detail of the frame in the first partial fold position;

FIG. 7 illustrates a view according to direction VII in FIG. 5 partially sectioned, a detail of the frame in the first partial fold position;

FIG. 8 illustrates, from the rear, the frame in the second fold position;

FIG. 11 illustrates, in enlarged perspective, a hinge;

FIG. 12 illustrates, in two side views, a hinge detail;

FIG. 13 illustrates, in two side views, a hinge detail;

FIG. 14 illustrates, in a view used according to the section map XIV-XIV in FIG. 13, a hinge detail.

Figure 9:
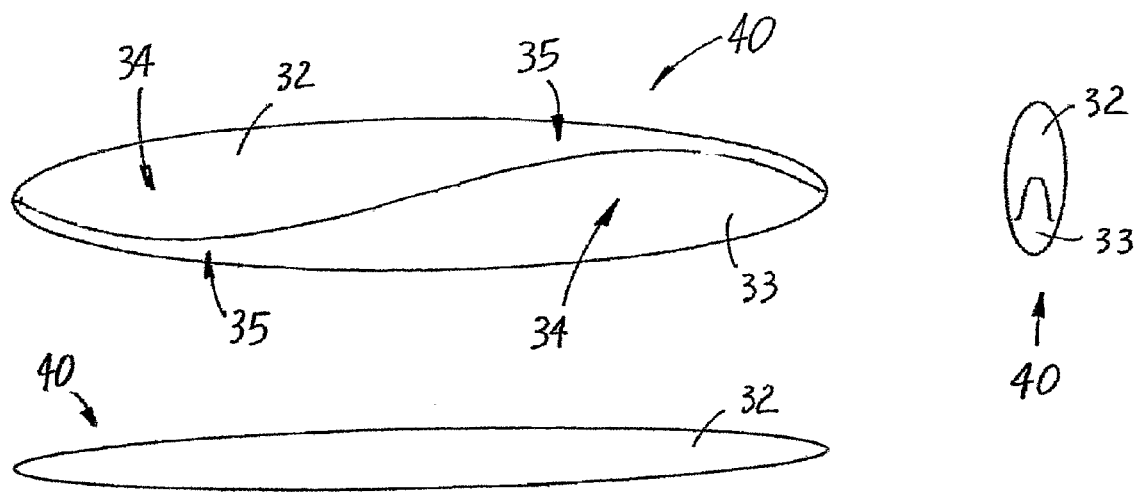
FIG. 9 illustrates in three views, frontal, side and rear respectively, the frame in the folded position.
Figure 10:
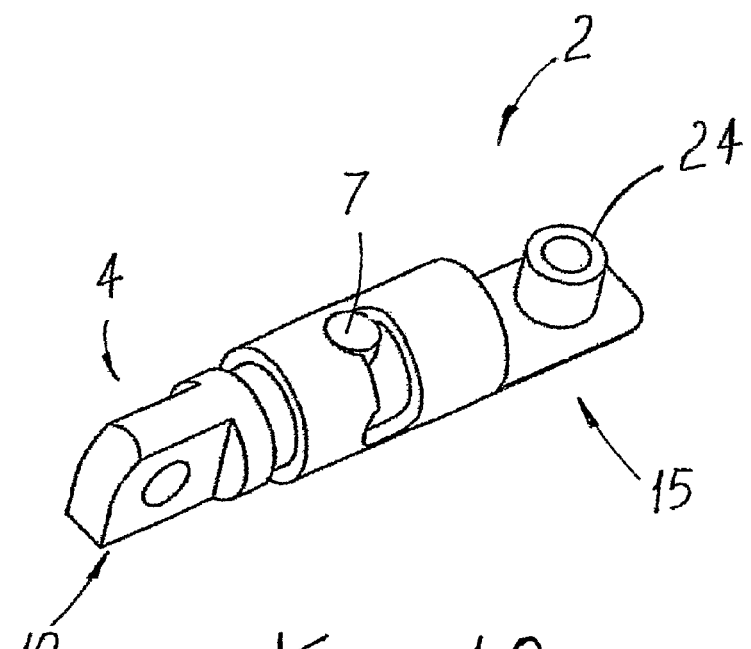
FIG. 10 illustrates, in perspective, a hinge in the open position.

With reference to the figures, number 1 indicates an eyeglass frame comprising a first hinge 2 and a second hinge 3, both the same, each made up of a first body 4 comprising a first joining leg 5, substantially cylindrical in shape from which, near its first flat end 6 a block point 7 radially protrudes, also preferably cylindrical.

At the second end 8 of this first leg 5 is a second block point 9 shown in a side view as a "T" shape defining a cylindrical head with a larger diameter than leg 5 from which a first fin protrudes 10, axial, with a parallelepiped shape.

This first fin 10 is preferably placed in diameter to the first leg 5 of the first body 4, parallel to the axis of the first block point 7 and has a first loop hole 11, cut crosswise and therefore orthogonal to the surface defined by the longitudinal axis of the first leg 5 and axis of the first block point 7.

The free end 12 of this first fin 10 frontally defines a first flat block surface 13, crosswise to the first leg 5 and joined by a curved segment 14 and a second block surface 13a composed of the lateral wall of the first fin facing the side from which the first block point 7 protrudes and, for example, about orthogonal to this first block surface.

Each of these first and second hinges 2 and 3 are composed of a second body 15, hollow, comprising a second, cylindrical shaped leg 16, inside of which is a first cavity 17, also cylindrical, open at the first end 18 of the second body 15 and coaxial to it.

On the lateral surface of this first cavity 17 is a first circumferential guide 19 composed of a groove 20, straight and looping, that extends for an arch of specific range, for example equal to about 90°, to define, at its opposite ends, a first housing 20a and a second housing 20b.

These first and second housing 20a and 20b, placed respectively rotated by about 90° to the longitudinal axis of the first cavity 17, comprise a protruding curved segment pointing from the first end 18 of the second body 15, from the straight segment that joins them.

Beneficially, this groove 20, in its central straight segment, is slightly wider than the diameter of the first block point 7 to permit it to slide.

The curved segment of the profile of the first and second housings 20a and 20b are also shaped to permit the selective housing of the first block point 7 inside of them.

From the second body 15 protrudes, according to a cord, a second fin 21, it, therefore, protrudes from a second flat end 22 of the second leg 16 and has a circle arch sectional shape that develops along a generatrix.

This second fin, 21, has a first flat side 23 that faces the longitudinal axis of the second leg 16 and is preferably parallel to the first housing 20a.

A bearing 24, cylindrical shaped for example, axial to which is a second hole 25, preferably threaded, protrudes orthogonal from the first face 23, pointing in the same direction as the first housing 20a.

Lastly, the first and second hinges comprise an elastically adaptable element 26, preferably made up of a cylindrical compression rotor spring that can be housed inside the first cavity 17 of the second body 15 and secured, at one of its first ends, on bottom 17a of the latter.

The first cylindrical leg 5, of the first body 4 can therefore be inserted inside this first cavity 17 so that the first block point 7 is housed inside the first guide 19 made up of groove 20 while the first end 6 of this first leg 5 comes into contact with a second end of the elastically adaptable element 26.

The first body 4 is therefore rotationally joined to this second body 15 since it can rotate along the longitudinal axis of the first cavity 17 so as to selectively pass from a first position, also called the open position, where the first block point is housed inside the second housing 20a, to a second position, also called the folded position, where this first block point 7 is housed inside the second housing 20b.

In these positions, the elastically adaptable element acts against the first end 6 of the first body 4, to force the first block point 7 against the wall of the first or second housing to keep it in the selected position.

These first and second hinges, thus assembled, are associated with a frontal piece 27, respectively at a first side end 28, and a second side end 29 of the latter by a bearing 24, each, for example, that can restrain a different lens 30, defined on or supported by this frontal piece by a fastening screw in the thread made inside the second hole 25.

Suitably, the second flat end 22 of the second leg 16 of the second body 15 can act as a block for the side wall 31 of lens 30 preventing any rotation of the first and second hinges 2 and 3 around the bearing 24.

In these conditions, the first housing 20a of each hinge faces rear compared to the frontal piece and is about orthogonal to it consequent to the fact that the bearing faces in the same direction of this first housing 20.

Beneficially, the shape of the first and second hinges 2 and 3, the same, make sure that the first hinge 2, linked to the frontal piece 27 at its first end 28, presents the second housing 20b facing up while the second hinge 3, linked to the frontal piece 27 at its second end 27 presents the second housing 20b facing down.

Connected to frontal piece 27, in its central area, is a removable elastic nose piece 41, made, for example, of rubber or other elastic material, to rest this frontal piece to the user's nose; in this way the nose piece is easily interchangeable if worn or dirty. The frame 1 also comprises a first earpiece 32 and a second earpiece 33, the same, semi-shell shaped.

The width of these earpieces is beneficially wider than the thickness of the frontal piece 27 and slightly thinner, at least in their central area, than the thickness of nose piece 41, while their length is slightly longer than the distance between the opposite ends of the first and second hinges protruding laterally from the frontal piece.

Each of these first and second earpiece has a front surface 34 with an internal convex profile and rear surface 35 with a concave internal profile, counter-shaped to front surface 34 so that these earpieces, if longitudinally overlapped, reciprocally match to create a housing.

These first and second earpieces 32 and 33 have, at one of their front ends 36, a third housing 37, a third housing 37, open and slightly thicker than the one of the first fin 10 of the first body 7 to permit insertion.

This third housing is equipped with a pair of first pins 38, facing each other and protruding from the lower and upper bases of this third housing 37 towards the interior of the latter.

These first pins 38, cylindrical for example, have a diameter slightly smaller than that of the first hole 11 in the first fin 10 so they can be inserted once that latter is housed inside the third housing 37, creating a rotating connection between the first earpiece and the first hinge and between the second earpiece and the second hinge respectively.

The third housing 37 is also equipped with a bottom 39, preferably flat, against which the first block surface 13 can be selectively blocked, frontally defined on each first fin 10 and the second block surface 13a, orthogonal to it.

Thanks to the presence of the curved segment 14 which joins these first and second block surfaces, the first and second earpieces can rotate, compared to the first and second hinge respectively, around the first pins 18 so as to move from a first position, where they are orthogonal to the frontal piece 27, to a second position where they are about parallel to the latter.

Frame operations according to the find foresee that, in order to permit user utility, it assumes a shape also called the utility shape, where the first and second earpieces are positioned parallel to each other and protrude to the rear about orthogonal to the frontal piece, as illustrated in FIGS. from 1 to 4.

In this condition, the first block of each hinge is housed inside the first housing 20a, on the second body of each hinge.

Starting from this configuration, the frame can change, by rotating the first body of each hinge around the axis of its relevant second body, to a first intermediate position, illustrated in FIG. 5, where the first and second earpieces are almost parallel to each other and to the frontal piece, protruding from the latter in opposite directions, one up and the other down.

In fact, during this rotation, the first block 7 of each hinge moves from the first housing 20a to the second housing 20b; thanks to the beneficial location of the first and second hinges, the same, these second housings 20b are one faced up and the other faced down, also forcing these positions on the earpieces that they support respectively.

By rotating each earpiece around the first pins 18, through which they are rotationally linked to the first body of each hinge, the frame can be brought, passing through a second intermediate position, illustrated as an example in FIG. 8; to a folded position illustrated in FIG. 9 where these earpieces match longitudinally to create shell 40.

Since the width of these earpieces are greater than the thickness of frontal piece 27 and their length greater than the distance between the opposite ends of the two hinges that laterally protrude from the latter, shell 40 can hold the frontal piece 27 and hinges 2 and 3.

Furthermore, since the width of these earpieces are, at least in their central area, not as thick as the elastic nose piece 41, once moved to the folded position they slightly deform the latter to guarantee a secure closing of shell 40.

Additionally, the elastic nose piece is a guard for the frontal piece it is linked to.

This shell, with opportune resistance and rigidity, is a protection for the eyeglasses and entire frame which therefore does not need to be placed inside a separate case, offering optimal convenience and practicality.

If the user wishes to wear the frame, the reverse procedure of the one illustrated above for folding leads to the complete opening of the same and is comfortably wearable.

This is proof as to how the find has achieved its set claim and purposes, having discovered an eyeglass frame that permits the creation of is quick housing without requiring the use of external elements for its protection and safeguarding the frontal piece it supports.

Another important purpose achieved by the find is that to guarantee simple and safe operations, while aesthetically pleasing in all operating conditions.

Naturally the materials used as well as the sizes of the single find components can be more pertinent according to the specific needs.

The different ways to perform certain different functions should not certainly coexist only in the illustrated creation shape but can be individually present in different creation shapes, even not illustrated.

The aspects indicated as advantageous, opportune or similar can also be missing or replaced by equivalents.

The invention claimed is:

1. Eyeglass frame comprising
a frontal piece;
two earpieces rotationally linked to the frontal piece by means of a first and second hinge respectively, said first and second hinges being adapted to let the corresponding earpiece rotate with respect to the frontal piece so as to move from a first position, where the earpieces are orthogonal to the frontal piece, to a second position where the earpieces are about parallel to the frontal piece and are positioned on the upper and lower side thereof, wherein the earpieces are semi-shell shaped such that in the second position they can form a shell to temporarily hold said frontal piece.

2. Eyeglass frame according to claim 1, wherein the earpieces are semi-shell shaped such that in the second position they match longitudinally to create the shell.

3. Eyeglass frame according to claim 1, wherein said first and second hinges are each made up of a first body rotationally linked to the earpiece and rotationally movable within a second hollow body linked to the frontal piece.

4. Eyeglass frame according to claim 3, wherein an elastically adaptable element, preferably made up of a cylindrical compression rotor spring, is housed inside a first cavity of the second body, secured thereto and mounted in contact with the first body to keep it in a selected position of said first or second positions.

5. Eyeglass frame according to claim 3, wherein said first body comprises a first joining leg, substantially cylindrical in shape from which, near its first flat end, a first block point, preferably cylindrical, radially protrudes, said first joining leg being housed into a cavity which coaxially opens at a first end of a second cylindrical shaped leg in said second hollow body.

6. Eyeglass frame according to claim 5 wherein the lateral surface of said first cavity has a first circumferential guide composed of a straight and looping groove that extends for an arch of specific range to define, at its opposite ends, a first and second housing.

7. Eyeglass frame according to claim 6, wherein said first and second housings are positioned rotated about 90° according to the longitudinal axis of said first cavity.

8. Eyeglass frame according to claim 7, wherein the width of said groove, at a central straight segment of its joining said first and second housings, is slightly greater than the diameter of said first block to permit the sliding of the latter therein, such that when said first body is rotationally joined to said second body it is able to rotate about the longitudinal axis of the first cavity, so as to selectively pass from a first position, where the first block point is housed inside the first housing, to a second position, where the first block point is housed inside the second housing, said first and second housings being counter-shaped to said first block to permit the selective housing inside these latter.

9. Eyeglass frame according to claim 8, wherein at the second end of said first joining leg there is provided a second block point having a "T" configuration and defining a cylindrical head which has a greater diameter than said first joining leg and from which a first axial fin protrudes.

10. Eyeglass frame according to claim 9, wherein said first axial fin is positioned at a diameter of said first leg and has a first loop hole, crosswise on it and orthogonal to a surface defined by the longitudinal axis of said first leg and the axis of said first block point.

11. Eyeglass frame according to claim 10, wherein the free end of said first fin frontally defines a first flat block surface, crosswise to said first leg and joined by a curved segment to a second block surface, made up of the lateral wall of said first fin facing from the side from which said first block protrudes.

12. Eyeglass frame according to claim 10, wherein a second fin according to a cord protrudes from a second flat end of said second leg and has a circle arch sectional shape that develops along a generatrix.

13. Eyeglass frame according to claim 12, wherein said second fin has a first flat side that faces the longitudinal axis of said second leg.

14. Eyeglass frame according to claim 13, wherein a bearing, preferably cylindrical shaped, axial to which a second hole is made, preferably threaded, protrudes orthogonal from said first flat side, facing in the same direction of said first housing.

15. Eyeglass frame according to claim 14, wherein said first housing of each of said hinges faces down from said frontal piece and is orthogonal to it.

16. Eyeglass frame according to claim 15, wherein said first hinge has its second housing facing up with respect to the frontal piece, while said second hinge has its second housing facing down.

17. Eyeglass frame according to claim 9, wherein said first and second earpieces have, at one of their front ends, a third housing, open and slightly thicker than the one on said first fin of said first body to permit reciprocal insertion.

18. Eyeglass frame according to claim 17, wherein said third housing is equipped with a pair of first pins that face each other and protrude from the lower and upper bases of said third housing towards the interior of the latter.

19. Eyeglass frame according to claim 18, wherein said first pins are preferably cylindrical and have a diameter slightly smaller than that of said first hole in said first fin, so that they can be inserted once that latter is housed inside said third housing, creating a rotating connection between said earpieces and said hinges.

20. Eyeglass frame according to claim 19, wherein said third housing is equipped with a bottom against which said first block surface can be selectively blocked, which is frontally defined on each first fin and said second block surface, orthogonal to it.

21. Eyeglass frame according to claim 1, wherein each of said earpieces has a front surface with an internal convex profile and rear surface with a concave internal profile, counter-shaped to said front surface so that said earpieces, when longitudinally overlapped, reciprocally match to create a housing for the frontal piece.

22. Eyeglass frame according to claim 1, wherein a removable elastic nose piece, is connected to said frontal piece, in its central area, and has a thickness greater than the frontal piece, the width of said earpieces being wider than the thickness of said frontal piece and slightly thinner, at least in their central area, than the thickness of the nose piece.

23. Eyeglass frame according to claim 1 wherein said first and second hinges are mounted to protrude laterally from said frontal piece, and the length of said earpieces is equal or slightly longer than the distance between the opposite ends of said first and second hinges.

* * * * *